(12) United States Patent
Shaw et al.

(10) Patent No.: US 7,355,165 B2
(45) Date of Patent: Apr. 8, 2008

(54) OPTICAL ENCODER AND METHOD FOR USING SAME

(75) Inventors: Jacob Shaw, Oak Park, IL (US); Michael Margraf, Highland, IN (US)

(73) Assignee: Grayhill, Inc., Lagrange, IL (US)

( * ) Notice: Subject to any disclaimer, the term of this patent is extended or adjusted under 35 U.S.C. 154(b) by 135 days.

(21) Appl. No.: 11/361,147

(22) Filed: Feb. 23, 2006

(65) Prior Publication Data

US 2007/0194219 A1 Aug. 23, 2007

(51) Int. Cl.
*G01D 5/34* (2006.01)
*G01J 9/00* (2006.01)

(52) U.S. Cl. .............................. 250/231.13; 250/231.14
(58) Field of Classification Search ............................... 250/231.13–231.18
See application file for complete search history.

(56) References Cited

U.S. PATENT DOCUMENTS

| | | | |
|---|---|---|---|
| 4,914,437 A * | 4/1990 | Kibrick et al. ................. 341/3 |
| 6,759,933 B2 | 7/2004 | Fallak | |
| 6,784,417 B2 * | 8/2004 | Sonoki ................... 250/231.13 |
| 6,963,063 B2 * | 11/2005 | Johnson .................. 250/231.13 |
| 7,109,469 B2 * | 9/2006 | Hayashi ...................... 250/221 |
| 2004/0041086 A1 * | 3/2004 | Imamura ................ 250/231.14 |

* cited by examiner

*Primary Examiner*—Georgia Epps
*Assistant Examiner*—Tony Ko
(74) *Attorney, Agent, or Firm*—Patents+TMS, P.C.

(57) ABSTRACT

An optical encoder, a system and a method for outputting a signal are provided. The optical encoder and the system have a shaft extending from an interior of a housing. A circuit board having a light emitting element and a light detector is connected to the housing. The light emitting element emits an amount of light within the interior of the housing. A light pipe transmits, deflects and/or directs the amount of light from the light emitting element toward the light detector. A rotor which is connected to the shaft rotates to change the amount of light received by the light detector. The shaft is connected to a sprocket which contacts a spring to produce a sound or vibration which indicates the shaft is rotating, twisting and/or turning. The circuit board outputs a signal via a cable based on the amount of light received by the light detector. The signal corresponds to a position and/or a location of the shaft.

18 Claims, 3 Drawing Sheets

OPTICAL ENCODER AND METHOD FOR USING SAME

BACKGROUND OF THE INVENTION

The present invention generally relates to an encoder, a system and a method for outputting a signal. More specifically, the present invention relates to an encoder and a system which detects light emitting from a light emitting element with a light detector to output a signal.

The encoder and the system may have a housing. A light emitting element, a light detector and/or a rotor may be within the housing. The light detector may detect light from the light emitting element. A light pipe may transmit and/or may deflect light from the light emitting element in the housing.

The rotor may cooperate with the shaft. Rotation of the shaft may rotate the rotor to block, to deflect and/or to absorb light from the light emitting element. The light detector may detect movement and/or a position of the shaft. The shaft may rotate to move a sprocket which may contact a spring. A cable and/or terminal pins may output a signal based on the direction, the amount and/or the intensity of light. The signal may correspond to the position of the shaft. The shaft may contact a pushbutton which may contact a circuit board to output the signal via the cable and/or the terminal pins.

It is generally known to incorporate and/or to connect a switch to a device, such as, for example, a computer, a radio, a global positioning system, a television, a game system and/or the like. The switch outputs a signal to control the device. For example, the switch may output a signal to change a radio station and/or to control power supplied to the device. In another example, a user may output a signal to control a display for a global positioning system. A user may control the switch by turning and/or depressing a shaft within the switch. Movement of the shaft outputs the signal to a processing unit. The signal corresponds to a position of the shaft. The processing unit receives the signal to control the device.

More specifically, the switch contacts a circuit by, for example, an arm attached to the shaft. As the switch turns, the arm of the shaft engages one of an array of points within the circuit which are arranged around the shaft. The circuit is closed in a loop by contact with the arm of the shaft. As a result, the switch outputs a signal which corresponds to a location of the shaft. However, repeated contact between the arm of the shaft and the points of the circuit result in the switch failing to output the signal. For example, points within the circuit may chip and/or may separate from the circuit to prevent the switch from outputting the signal. In addition, the shaft of the switch may eventually rotate without the arm contacting the circuit and/or without the contact of the circuit closing the loop of the circuit. Accordingly, the operational life of the switch is limited.

It is also generally known for a user to use a magnetic switch to output a signal. The magnetic switch uses a Hall effect sensor to output a signal rather than a mechanical arm to output a signal. The magnetic switch has a magnet positioned on the shaft at a location within the switch. The user rotates the shaft to output a signal to, for example, turn a radio to an "on" position. Rotation of the shaft moves the magnet to produce changes in magnetic field density. The Hall effect-sensor detects changes in magnetic field density to output the signal corresponding to a position of the shaft.

However, movement of the shaft is limited by the locations of the Hall effect sensor. Specifically, the switch will only determine positions of the shaft where a Hall effect sensor is located. Providing multiple sensors at multiple locations within the switch is costly. In addition, multiple sensors results in a higher likelihood that the switch will fail to output the signal or output an inaccurate signal.

Further, a magnetically operated switch produces no sound, such as, a clicking noise. Still further, the magnetic switch does not provide tactile feedback to a user. As a result, a user cannot determine whether a shaft of the switch is moving and how far the shaft of the switch has moved from a previous position.

A need, therefore, exists for an encoder, a system and a method for outputting a signal. Additionally, a need exists for an encoder, a system and a method for outputting a signal which optically detects positions of a shaft. Further, a need exists for an encoder, a system and a method for outputting a signal having a shaft connected to a sprocket which contacts a spring to provide audible and tactile feedback to a user. Still further, a need exists for an encoder, a system and a method for outputting a signal having a shaft rotatable to multiple positions which may be detected by a light detector.

Moreover, a need exists for an encoder, a system and a method for outputting a signal having a shaft wherein depressing and/or pushing the shaft depresses a push button to provide tactile feedback to a user. Furthermore, a need exists for an encoder, a system and a method for outputting a signal having a shaft wherein rotating the shaft produces a sound to indicate that the shaft is rotating. In addition, a need exists for an encoder, a system and a method for outputting a signal having a single circuit board for detecting light and transmitting light within the encoder. Further, a need exists for an encoder, a system and a method for outputting a signal which provides a nearly infinite life of components of the encoder and/or the system.

SUMMARY OF THE INVENTION

The present invention relates to an encoder, a system and a method for outputting a signal. More specifically, the encoder and the system may optically detect movement of a shaft to output a signal which may correspond to a position and/or a location of the shaft. A circuit board may be positioned and/or may be located in the housing. The circuit board may have a light emitting element and/or a light detector. A light pipe may direct and/or may transmit the light in the housing. A rotor may absorb, may reflect and/or may direct light from the light pipe to the light detector. The housing may have terminal pins and/or a cable to output a signal from the light detector. The signal may be based on an amount, a direction and/or an intensity of the light. The signal may correspond to a location and/or a position of the shaft.

To this end, in an embodiment of the present invention, an optical encoder is provided. The optical encoder has a housing having an interior wherein the interior is defined between a top end and a bottom end. Further, the optical encoder has a shaft extending outward with respect to the housing to a point exterior to the housing. Still further, the optical encoder a light emitting element connected to the housing wherein the light emitting element transmits an amount of light. Moreover, the optical encoder has a light detector connected to the housing wherein the light detector detects the amount of light. Furthermore, the optical encoder has a light pipe positioned between the light detector and the light emitting element wherein the light pipe deflects light from the light emitting element to the light detector.

In an embodiment, the optical encoder has a rotor connected to the shaft wherein movement of the rotor changes the amount of light detected by the light detector.

In an embodiment, the optical encoder has a circuit board connected to the housing wherein the light emitting element and the light detector are connected to the circuit board.

In an embodiment, the optical encoder has a cable connected to the light detector wherein the cable transmits a signal based on the amount of light detected by the light detector.

In an embodiment, the optical encoder has a button within the housing wherein depressing the shaft contacts the button.

In an embodiment, the optical encoder has a sprocket connected to the shaft wherein movement of the shaft moves the sprocket.

In another embodiment a system for encoding an amount of light is provided. The system has a housing having a height defined between a top surface and a bottom surface. Further, the system has a circuit board connected to the housing wherein the circuit board transmits an electrical signal. Still further, the system has a means for emitting light wherein the means for emitting light transmits the amount of light to the housing. Moreover, the system has a means for detecting light connected to the circuit board. Furthermore, the system has a deflecting means positioned between the means for emitting light and the means for detecting light wherein the deflecting means deflects the light from the means for emitting light towards the means for detecting light.

In an embodiment, the system has means for changing the amount of light received by the means for detecting light.

In an embodiment, the system has means for absorbing the amount of light transmitted by the means for emitting light.

In an embodiment, the system has means for transmitting the signal from the housing.

In an embodiment, the system has means for contacting the circuit board to output the electrical signal.

In an embodiment, the system has means for producing a noise wherein the noise sounds to indicate a change in the amount of light received by the means for detecting light.

In an embodiment, the system has means for producing a vibration wherein the vibration indicates a change in the amount of light received by the means for detecting light.

In another embodiment a method for outputting a signal is provided. The method has the step of providing a housing having a width defined between a distal end and a proximate end. Further, the method has the step of emitting an amount of light to the housing. Still further, the method has the step of deflecting the amount light from the proximate end to the distal end. Moreover, the method has the step of detecting the amount of light at the distal end. Furthermore, the method has the step of transmitting the signal wherein the signal is an electrical signal and further wherein the signal is based on the amount of light detected at the distal end.

In an embodiment, the method has the step of connecting a shaft to the housing wherein movement of the shaft changes the amount of light transmitted to the distal end.

In an embodiment, the method has the step of positioning a rotor between the distal end and the proximate end of the housing wherein the rotor changes the amount of light transmitted to the distal end.

In an embodiment, the method has the step of contacting a button to output the signal.

In an embodiment, the method has the step of connecting a spring to the housing wherein the spring produces a sound.

In an embodiment, the signal corresponds to a position of the shaft.

In an embodiment, the method has the step of connecting a sprocket to the housing wherein movement of the sprocket produces a sound.

It is, therefore, an advantage of the present invention to provide an encoder and a system and a method for outputting a signal which optically detects a position, a location and/or movement of a shaft.

Another advantage of the present invention is to provide an encoder and a system and a method for outputting a signal wherein rotation of the shaft moves a rotor to change a direction, an intensity and/or an amount of light received by a light detector.

And, another advantage of the present invention is to provide an encoder and a system and a method for outputting a signal having a light detector for optically detecting movement and/or a position of a shaft.

Yet another advantage of the present invention is to provide an encoder and a system and a method for outputting a signal having a single circuit board which may have a light emitting element and a light detector.

A further advantage of the present invention is to provide an encoder and a system and a method for outputting a signal wherein rotation of a shaft contacts a spring to provide tactile feedback to a user.

Moreover, another advantage of the present invention is to provide an encoder and a system and a method for outputting a signal wherein rotation of a shaft produces a sound to indicate that the shaft is rotating.

And, another advantage of the present invention is to provide an encoder and a system and a method for outputting a signal having a spring which may be adjusted to provide different audio feedbacks and/or different tactile feedbacks.

Another advantage of the present invention is to provide an encoder and a system and a method for outputting a signal wherein a shaft may be pressed to contact a pushbutton to output the signal.

A still further advantage of the present invention is to provide an encoder and a system and a method for outputting a signal having a light pipe which deflects and/or directs light from a first location to a second location.

Additional features and advantages of the present invention are described in, and will be apparent from, the detailed description of the presently preferred embodiments and from the drawings.

DETAILED DESCRIPTION OF THE PREFERRED EMBODIMENTS

The present invention relates to an encoder and a system and a method for outputting a signal. The encoder and the system may have a housing which may have a top end and a bottom end. The shaft may extend from an interior of the housing to an exterior of the housing. The shaft may be connected to and/or may be in contact with a rotor and/or a sprocket. Movement of the shaft may rotate and/or may turn the sprocket to contact a spring to produce audible and/or tactile feedback to a user. A light emitting element may transmit light within the housing. A light pipe may transmit light from the bottom end of the housing to the top end of the housing. Rotation of the shaft may turn and/or may rotate the rotor to block, to absorb and/or to deflect light from a photodetector. The shaft may be pressed, pushed and/or depressed to contact a push button to output an electrical signal via a cable and/or terminal pins. The photodetector may output an electrical signal based on an amount, an intensity and/or a location of light transmitted from the light emitting element via the cable and/or the terminal pins.

Figure 1:
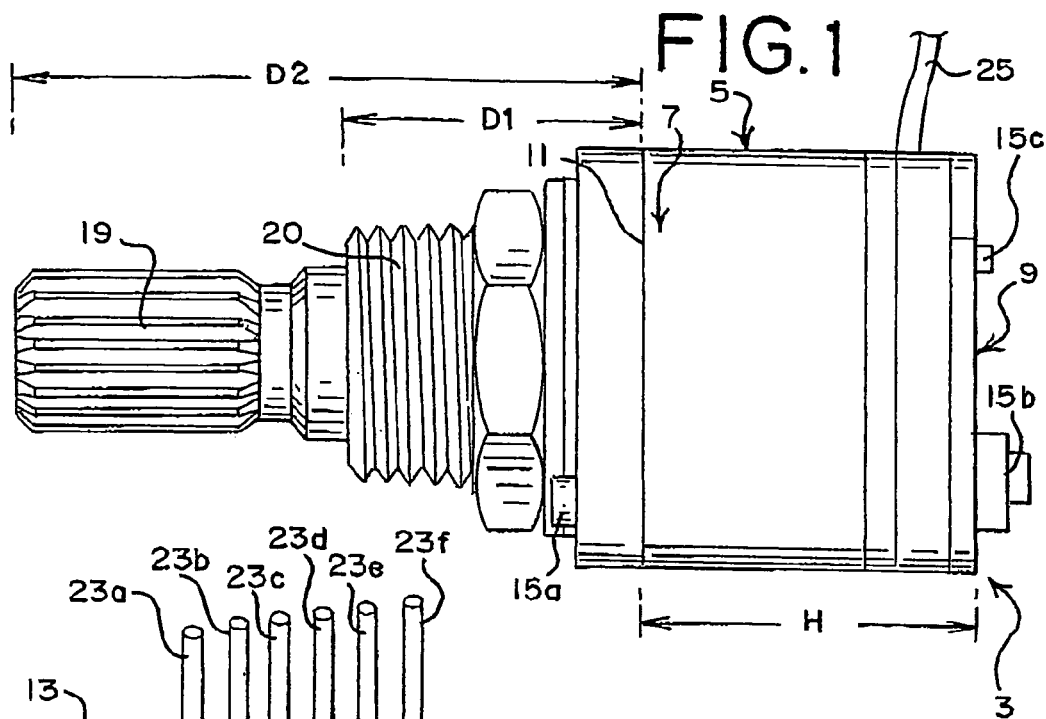
FIG. 1 illustrates a side plan view of a shaft within a housing in an embodiment of the present invention.
Figure 2:
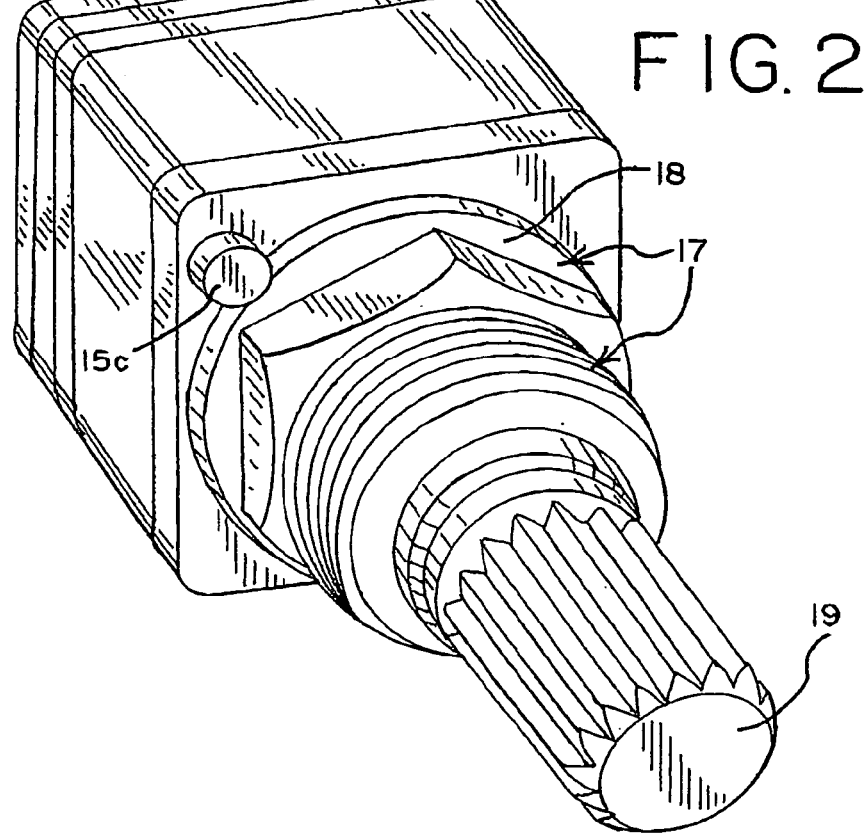
FIG. 2 illustrates a perspective view of a housing and a shaft in an embodiment of the present invention.
Figure 3:
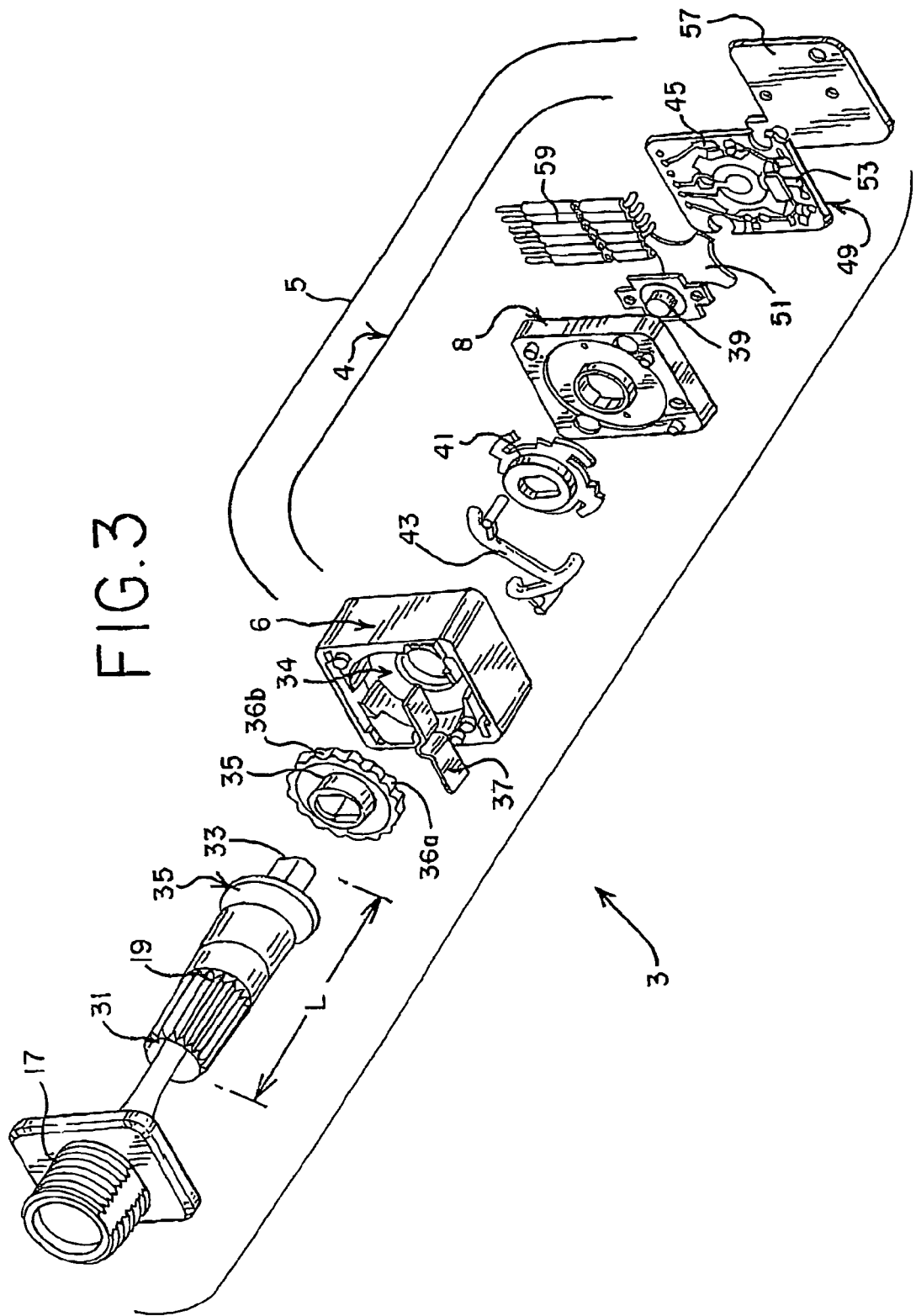
FIG. 3 illustrates an exploded perspective view of the shaft, a housing and a rotor in an embodiment of the present invention.

Referring now to the drawings wherein like numerals refer to like parts, FIG. 1 and FIG. 2 illustrate an encoder 3 having a housing 5. The housing 5 may have a height H defined between a top end 7 and a bottom end 9. Pins 15*a*-15*d* may connect, may secure and/or may attach a top surface 11 to a bottom surface 13 of the housing 5. Between the top surface 11 and the bottom surface 13 of the housing 5 may be an interior 4 of the housing 5, as illustrated in FIG. 3. The pins 15*a*-15*d* may extend from the top surface 11 to the bottom surface 13.

Figure 4:
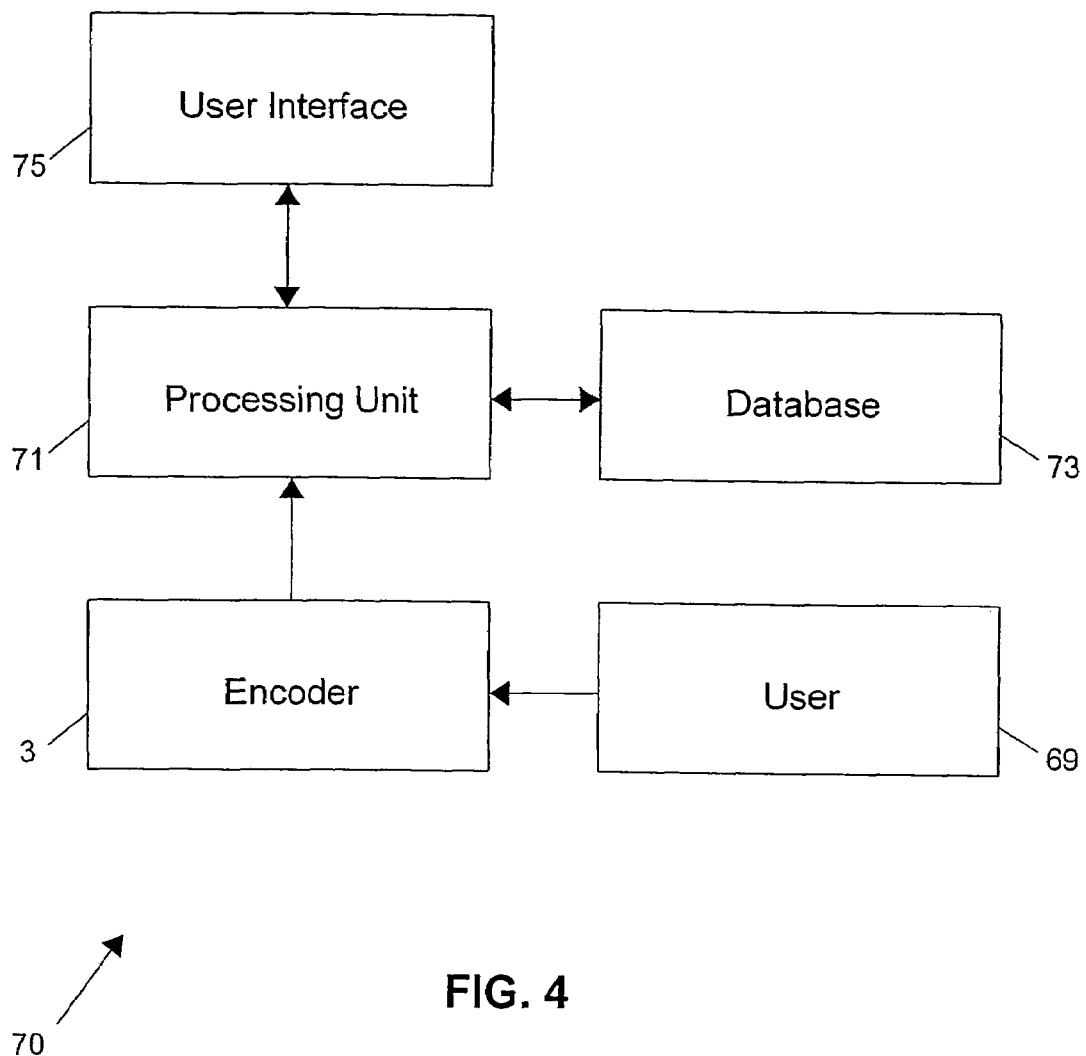
FIG. 4 illustrates a black box diagram of a system using an encoder to optically detect movement of a shaft.

A bushing 17 may connect to and/or may secure to the top surface 11 of the housing 5 via the pins 15*a*-15*d*. In an embodiment, the pins 15*a*-15*d* may be integrally formed with the bushing 17. The bushing 17 may support and/or may guide a shaft 19 which may extend from the interior 4 of the housing 5 through the top surface 11. The bushing 17 may have a first portion 18 which may be, for example, a flat surface. The bushing 17 may have a second portion 20 which may extend from the first portion 18. The second portion 20 of the bushing 17 may extend a distance D1 from the first portion 18. The second portion 20 of the bushing 17 may have threads 21 which may be, for example, male threads. The second portion 20 may secure to, may connect to and/or may attach to a processing unit 71, as illustrated in FIG. 4.

The shaft 19 may extend a distance D2 exterior to the housing 5. The distance D2 may be greater than the distance D1. The shaft 19 may rotate, may turn and/or may twist with respect to the top surface 11 of the housing 5. The shaft 19 may be depressed and/or may be pushed toward the bottom surface 13 of the housing 5. Movement of the shaft 19 may be converted to a signal, for example, an electrical signal, within the housing 5. A cable 25 and/or terminal pins 23*a*, 23*b* may output the signal from the housing 5. The signal may correspond to a location and/or a position of the shaft 19. The cable 25 and/or the terminal pins 23*a*-23*f* may attach to and/or may connect to the bottom portion 13 of the housing 5. The present invention should not be deemed limited to a specific device and/or method of outputting the signal from the housing 5.

FIG. 3 illustrates an exploded view of the encoder 3 in an embodiment of the present invention. The encoder 3 may have a housing 5 which may have a first section 6 and/or a second section 8. The first section 6 may be secured, connected and/or attached to the second section 8 via the pins 15*a*-15*d*, as illustrated in FIG. 1.

The shaft 19 may have a length L defined between a first end 31 and a second end 33. As illustrated in FIG. 1, the first end 31 may extend the distance D2 outward from the top surface 11 of the housing 5. The second end 33 of the shaft 19 may contact, may connect to and/or may secure to a sprocket 35 and a rotor 41. The second end 33 of the shaft 19 may connect to and/or may contact an actuator 39. The shaft 19 may be depressed and/or may be pushed to contact the actuator 39.

The actuator 39 may made from an insulating material, such as, for example, rubber, plastic, felt, ceramic, porcelain and/or the like. To this end, the actuator 39 may absorb and/or may insulate the shaft 19 from voltage and/or current, such as, for example, the electrical signal. The shaft 19 may contact and/or may abut the actuator 39. Interaction between the shaft 19 and the actuator 39 may provide tactile and/or audible feedback to a user. The actuator 29 may be any material as known to one having ordinary skill in the art to provide a desired tactile and/or a desired audible feedback.

The shaft 19 may have a lip 35 extending outward with respect to the shaft 19. The sprocket 35 may secure to and/or may contact the lip 35. The lip 35 may prevent the sprocket 35 from moving outward with respect to the housing 5 toward the first end 31. In addition, the lip 35 may prevent the shaft 19 from moving outward with respect to the bushing 17 and/or the housing 19. The lip 35 may also prevent the shaft 19 from being removed from the housing 5 and/or the bushing 17.

The sprocket 35 may be attached to, may be secured to and/or may be connected to the shaft 19. The sprocket 35 may be connected to and/or in contact with the first section 6 of the housing 5. The sprocket 35 may be located and/or may be positioned in an opening 34, such as, for example, a crevice, a valley, a cut-out and/or the like of the first section 6 of the housing 5. The sprocket 35 may be rotatable with respect to the first section 6 of the housing 5. The shaft 19 may extend within the interior 4 of the housing 5 through the sprocket 35.

Rotation of the shaft 19 may turn and/or may rotate the sprocket 35 to contact a spring 37. The sprocket 35 interacts and/or contacts the spring 37 to provide audible and/or tactile feedback to a user 69. The sprocket 35 may have, for example, grooves 36*a*, 36*b* which may contact the spring 37 to provide audible and tactile feedback. The sprocket 35 and/or the spring 37 may be removeable. Changing a shape, a size and/or a dimension of the spring 37 and/or the sprocket 37 may adjust and/or change the audible feedback and/or the tactile feedback. The sprocket 35 may have, for example, grooves 36*a*, 36*b* which may contact the spring 37 to provide the audible and/or the tactile feedback. The grooves 36*a*, 36*b* may be shaped, such as, for example, rounded, flat, pointed and/or the like. The present invention should not be deemed limited to a specific size, shape and/or configuration of the sprocket 35. The sprocket 35 may be adjusted and/or modified to provide different tactile feedback and different audio feedback as known to one having ordinary skill in the art.

The spring 37 may be positioned and/or may be located in the first section 6 of the housing 5. The spring 37 may extend toward the sprocket 35 within the housing 5. Rotation of the shaft 19 may rotate the sprocket 35 which may contact the spring 37. The sprocket 35 may move, may push and/or may depress the spring 37 outward with respect to the sprocket 35. The present invention should not be deemed limited to a specific number, size, shape and/or configuration of the spring 37. The spring 37 may be adjusted and/or modified to provide any tactile feedback and any audio feedback known to one having ordinary skill in the art. In addition, any number of springs may be added to provide different tactile feedback and/or different audio feedback known to one having ordinary skill in the art.

The shaft 19 may extend through the first section 6 of the housing 5. A rotor 41 and/or a light pipe 43 may be located and/or may be positioned between the first section 6 and/or the second section 8. The light pipe 43 may connect to and/or may secure to the first section 6 of the housing 5. The light pipe 43 may be integrally formed with the first section 6 and/or the second section 8 of the housing 5. The light pipe 43 may transmit and/or may deflect light from a light emitting element 53. The light pipe 43 may deflect and/or may transmit light from the second section 8 to the first section 6 of the housing 5. The light pipe 43 may be a conduit, such as, for example, a tube, a rod and/or the like. The light pipe 43 may be positioned and/or may be located to transmit and/or to deflect light from the bottom end 9 to the top end 7 of the housing 5. The light pipe 43 may transmit light from the light emitting element 53 toward the rotor 41 and/or a light detector 45.

The shaft 19 may extend through the rotor 41. The bottom end 9 of the shaft 19 may terminate at the rotor 41. The shaft 19 may connect to, may secure to and/or may contact the rotor 41. The rotor 41 may be located and/or may be positioned on and/or between the first section 6 and/or the second section 8. The rotor 41 may rotate and/or may turn with respect to the housing 5. Rotation of the shaft 19 may rotate and/or may turn the rotor 41 to block, to deflect and/or to absorb light transmitted from the light pipe 43 and/or the light detector 45. The rotor 41 may rotate and/or may turn to change an amount, a direction, an intensity and/or a location of light transmitted to the light detector 45.

The actuator 39 may extend through the second section 8 of the housing 5. Depressing and/or pushing the shaft 19 may contact and/or may activate and/or may engage the actuator 39 to output an electrical signal. The actuator 39 may be depressed and/or pushed to contact and/or to connect to a circuit board 49. The actuator 39 may contact and/or connect to the circuit board 49 via a button 51.

Depressing the button 51 may depress the actuator 39 to contact the circuit board 49. The button 51 may be, for example, a conductive material, such as, for example, copper, nickel, gold, silver, aluminum, graphite, iron, brass and/or the like. The button 51 may contact the circuit board 49 to complete and/or to form a circuit (not shown) to output the electrical signal which may correspond to a location and/or a position of the shaft 19. Alternatively, the button 51 may be made from, for example, an insulated material, such as, for example, plastic, rubber, felt, ceramic, porcelain and/or the like. The button 51 may contact the circuit board 49 to add resistance to and/or to interrupt the circuit (not shown). The button 51 may contact the circuit board 49 to provide audible feedback and/or tactile feedback. The button 51 may be adjusted and/or modified to provide different tactile feedback and different audio feedback known to one having ordinary skill in the art. For example, the button 51 may be made from a different material to provide different tactile feedback and/or different audio feedback known to one having ordinary skill in the art.

The circuit board 49 may be located and/or may be positioned at the bottom end 9 of the housing 5. The circuit board 49 may contain and/or may secure the light emitting element 53 and/or the light detector 45. The light emitting element 53 may be, for example, a light emitting diode which may transmit visible light, infrared light and/or the like. The light emitting element 53 may transmit an amount of light within the housing 5. The light pipe 43 may transmit and/or may deflect the amount of light from the bottom end 9 of the housing 5 to the top end 7 of the housing 5.

The light detector 45 may detect an amount, an intensity, a direction and/or a location of light transmitted from the light emitting element 53 and/or the light pipe 43. The light detector 45 may output a signal, such as, for example, an electrical signal. The signal may correspond to a location and/or a position of the shaft 19. The signal may be output from the housing 5 via a cable 59. Terminal pins 23*a*, 23*b*, such as, for example, electrical contacts and/or the like may output the signal from the housing 5, as illustrated in FIG. 2. The present invention should not be deemed limited to a specific device and/or method of outputting the signal from the housing 5.

The pins 15*a*-15*d* may extend from the top end 7 of the housing 5 through the first section 6, the second section 8, the circuit board 49 and/or a plate 57. The pins 15*a*-15*d* may be integrally formed with the bushing 17. The pins 15*a*-15*d* may be larger in size at the bushing 17 to secure the bushing 17 to the housing 5. In addition, the pins 15*a*-15*d* may secure the plate 57 to the housing 5.

The plate 57 may prevent the circuit board 49 from moving, bending, flexing and/or the like. The plate 57 may apply a force to the actuator 39 and/or the button 51. The force may move and/or may push the actuator 39 and/or the button 51 away from the circuit board 49. For example, the shaft 19 may depress the actuator 39 and/or the button 51 to contact the circuit board 49. The plate 57 may force the actuator 39 and/or the button 51 away from the circuit board 49 to an initial position relative to the circuit board 49.

In use, the shaft 19 may rotate and/or may turn to move the rotor 41 to change an amount and/or a direction of light transmitted to the light detector 45. The light emitting element 53 may transmit light within the housing 5. The light pipe 43 may deflect and/or may transmit light from the light emitting element 53 from, for example, the circuit board 49 to the top end 7 of the housing 5. The light detector 45 may detect the amount and/or the direction of light to output a first signal via the cable 59. Depressing and/or pushing the shaft 19 toward the bottom end 9 of the housing 5 may depress the actuator 39 to contact the circuit board 49 and output a second signal via the cable 59. The first signal, for example, may be greater than the second signal. Each signal, respectively, may correspond to a location and/or a position of the shaft 19.

FIG. 4 illustrates a black box diagram of a system 70 using an encoder to detect movement of a shaft in an embodiment of the present invention. The encoder 3 may be connected to and/or in communication with a processing unit 71 which may be connected to and/or in communication with a database 73. The processing unit 71 may be connected to and/or in communication with a user interface 75. The user interface 75 may display, for example, a map, a radio station, a menu, a selection screen and/or the like. For example, the user interface 75 may display a map illustrating roads, restaurants, businesses and/or the like. In another embodiment, the user interface 75 may display a list of, for example, radio stations. A user 69 may rotate the shaft 19 to move, for example, a cursor and/or an arrow to a desired radio station. Rotation of the shaft 19 may output a first electrical signal to the processing unit 71. The first electrical signal may correspond to a location and/or a position of the shaft 19. The user 69 may push and/or may depress the shaft 19 to select the desired radio station. Pushing and/or depressing the shaft 19 may output a second electrical signal to the second electrical signal to a location and/or to a position of the shaft 19. The present invention should not be deemed limited to the specific user interface. The processing unit 71 may be applied to different technologies known to one having ordinary skill in the art.

The housing 5 may have, for example, the first section 6 and the second section 8 which may be attached to and/or secured via the pins 15a-15d to define the interior 4 of the housing 5. The light emitting element 53 may transmit light within the housing 5. The shaft 19 may extend through the housing 5. The user 69 may move and/or may rotate the shaft 19 to move and/or to rotate the rotor 41 which may block, absorb and/or deflect light from the light emitting element 53. The housing 5 may output an electrical signal based on an amount, a direction and/or a location of light received and/or sensed by the light detector 45. The electrical signal may be transmitted to the processing unit 71 to communicate with the user interface 75 and/or the database 73.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An optical encoder comprising:
   a housing having an interior wherein the interior is defined between a top end and a bottom end;
   a shaft extending outward with respect to the housing to a point exterior to the housing;
   a circuit board connected to the housing;
   a light emitting element connected to the circuit board wherein the light emitting element transmits an amount of light;
   a light detector connected to the circuit board wherein the light detector detects the amount of light; and
   a light pipe positioned between the light detector and the light emitting element wherein the light pipe deflects light from the light emitting element to the light detector wherein the light pipe has a first end, a middle portion and a second end wherein the first end of the light pipe and the second end of the light pipe are located further from the top end of the housing than the middle portion of the light pipe a sprocket connected to the shaft wherein the sprocket produces a sound via rotation of the shaft.

2. The optical encoder of claim 1 further comprising:
   a rotor connected to the shaft wherein movement of the rotor changes the amount of light detected by the light detector.

3. The optical encoder of claim 1 further comprising:
   a cable connected to the light detector wherein the cable transmits a signal based on the amount of light detected by the light detector.

4. The optical encoder of claim 1 further comprising:
   a button within the housing wherein depressing the shaft contacts the button.

5. The optical encoder of claim 1 further comprising:
   a sprocket connected to the shaft wherein movement of the shaft moves the sprocket.

6. A system for encoding an amount of light, the system comprising:
   a housing having a height defined between a top surface and a bottom surface;
   a circuit board connected to the housing wherein the circuit board transmits an electrical signal;
   means for emitting light wherein the means for emitting light transmits the amount of light to the housing wherein the means for emitting light is connected to the circuit board;
   means for detecting light connected to the circuit board; and
   deflecting means positioned between the means for emitting light and the means for detecting light wherein the deflecting means deflects the light from the means for emitting light towards the means for detecting light wherein the deflection means has a first end, a middle portion and a second end wherein the first end of the deflection means and the second end of the deflection means are located further from the top surface of the housing than the middle portion of the deflection means; and a sprocket connected to the shaft wherein the sprocket produces a sound via rotation of the shaft.

7. The system of claim 6 further comprising:
   means for changing the amount of light received by the means for detecting light.

8. The system of claim 6 further comprising:
   means for absorbing the amount of light transmitted by the means for emitting light.

9. The system of claim 6 further comprising:
   means for transmitting the signal from the housing.

10. The system of claim 6 further comprising:
    means for contacting the circuit board to output the electrical signal.

11. The system of claim 6 further comprising:
    means for producing a noise wherein the noise sounds to indicate a change in the amount of light received by the means for detecting light.

12. The system of claim 6 further comprising:
    means for producing a vibration wherein the vibration indicates a change in the amount of light received by the means for detecting light.

13. A method for outputting a signal, the method comprising the steps of:
    providing a housing having a width defined between a distal end and a proximate end;
    emitting an amount of light in the housing from a circuit board connected to the housing wherein the light is emitted in a direction outward relative to the circuit board;
    deflecting the amount of light away from the mounting surface of the circuit board, substantially parallel with the mounting surface, and towards the mounting surface;
    detecting the amount of light wherein the light is detected by a light receiving means which is attached to the circuit board; and
    transmitting the signal wherein the signal is an electrical signal and further wherein the signal is based on the amount of light detected at the distal end; and connecting a sprocket to the housing wherein movement of the sproket produces a sound.

14. The method of claim 13 further comprising the step of:
    connecting a shaft to the housing wherein movement of the shaft changes the amount of light transmitted to the distal end.

15. The method of claim 13 further comprising the step of:
    positioning a rotor between the distal end and the proximate end of the housing wherein the rotor changes the amount of light transmitted to the distal end.

16. The method of claim 13 further comprising the step of:
    contacting a button to output the signal.

17. The method of claim 13 further comprising the step of:
    connecting a spring to the housing wherein the spring produces the sound.

18. The method of claim 13 wherein the signal corresponds to a position of the shaft.

* * * * *

UNITED STATES PATENT AND TRADEMARK OFFICE
CERTIFICATE OF CORRECTION

PATENT NO.        : 7,355,165 B2
APPLICATION NO.   : 11/361147
DATED             : April 8, 2008
INVENTOR(S)       : Shaw et al.

It is certified that error appears in the above-identified patent and that said Letters Patent is hereby corrected as shown below:

Column 1, line 63: Change "effect-sensor" to --effect sensor--

Column 10, line 39: Change "away from the mounting surface" to --away from a mounting surface--

Column 10, line 45: Delete "and"

Column 10, line 50: Change "sproket" to --sprocket--

Signed and Sealed this

Second Day of September, 2008

JON W. DUDAS
*Director of the United States Patent and Trademark Office*